United States Patent
Broadhurst et al.

(10) Patent No.: US 8,356,081 B2
(45) Date of Patent: Jan. 15, 2013

(54) AUTOMATED DOMAIN NAME REGISTRATION

(75) Inventors: Larry J. Broadhurst, Humble, TX (US); Jeffrey W. Johnson, Sterling, VA (US); Matthew E. Liberty, McLeon, VA (US); Matt Ho, Centreville, VA (US)

(73) Assignee: Verisign, Inc, Reston, VA (US)

( * ) Notice: Subject to any disclaimer, the term of this patent is extended or adjusted under 35 U.S.C. 154(b) by 1599 days.

(21) Appl. No.: 11/070,189

(22) Filed: Mar. 3, 2005

(65) Prior Publication Data

US 2005/0203891 A1 Sep. 15, 2005

Related U.S. Application Data

(62) Division of application No. 09/585,316, filed on Jun. 2, 2000, now Pat. No. 7,000,028.

(51) Int. Cl.
 *G06F 15/16* (2006.01)
 *G06F 15/173* (2006.01)
(52) U.S. Cl. ........ 709/217; 709/201; 709/203; 709/219; 709/226; 709/245
(58) Field of Classification Search ........................ None
See application file for complete search history.

(56) References Cited

U.S. PATENT DOCUMENTS

| | | | |
|---|---|---|---|
| 5,459,717 A | 10/1995 | Mullan et al. | |
| 5,692,174 A * | 11/1997 | Bireley et al. | 1/1 |
| 5,895,471 A | 4/1999 | King et al. | |
| 5,983,351 A | 11/1999 | Glogan | |
| 6,023,698 A | 2/2000 | Lavey, Jr. et al. | |
| 6,031,978 A | 2/2000 | Cotner et al. | |
| 6,195,691 B1 | 2/2001 | Brown | |
| 6,205,482 B1 | 3/2001 | Navarre et al. | |
| 6,233,572 B1 * | 5/2001 | Crawford et al. | 707/3 |
| 6,279,010 B1 | 8/2001 | Anderson | |
| 6,321,222 B1 * | 11/2001 | Soderstrom et al. | 707/5 |
| 6,338,082 B1 | 1/2002 | Schneider | |
| 6,381,627 B1 | 4/2002 | Kwan et al. | |
| 6,401,118 B1 * | 6/2002 | Thomas | 709/224 |
| 6,418,441 B1 | 7/2002 | Call | |
| 6,449,657 B2 * | 9/2002 | Stanbach et al. | 709/245 |
| 6,542,920 B1 * | 4/2003 | Belkin et al. | 718/104 |
| 6,560,634 B1 | 5/2003 | Broadhurst | |

(Continued)

FOREIGN PATENT DOCUMENTS

WO  WO 99/09726 A1  2/1999

(Continued)

OTHER PUBLICATIONS

Web archieve, "www.netdomains.com," May 2000; 9 pages.

(Continued)

*Primary Examiner* — Thu Nguyen
*Assistant Examiner* — Angela Widhalm
(74) *Attorney, Agent, or Firm* — MH2 Technology Law Group, LLP (57) ABSTRACT

An automated system and method to permit users to find and register available domain names in numerous different ccTLDs. The system provides real-time searching of large numbers of ccTLDs for each user so that during a single web session, the user can simply select the available ccTLDs from the resultant list, and purchase the desired ccTLDs online. The system also formats the user's information in the appropriate manner for each selected ccTLD and performs the necessary electronic transactions to register the ccTLDs.

39 Claims, 6 Drawing Sheets

U.S. PATENT DOCUMENTS

| | | | |
|---|---|---|---|
| 6,601,059 B1 * | 7/2003 | Fries .................................. | 707/3 |
| 6,625,594 B1 | 9/2003 | Rolland et al. | |
| 6,633,867 B1 * | 10/2003 | Kraft et al. ......................... | 707/3 |
| 6,650,634 B1 | 11/2003 | van Doorselaer et al. | |
| 6,895,430 B1 * | 5/2005 | Schneider ..................... | 709/217 |
| 7,167,904 B1 * | 1/2007 | Devarajan et al. ............. | 709/218 |
| 7,200,804 B1 * | 4/2007 | Khavari et al. ................. | 715/230 |
| 7,206,805 B1 * | 4/2007 | McLaughlin, Jr. ............. | 709/203 |
| 7,272,637 B1 * | 9/2007 | Himmelstein ................. | 709/217 |
| 7,437,725 B1 * | 10/2008 | Chang et al. .................. | 718/100 |
| 2001/0037295 A1 | 11/2001 | Olsen | |
| 2002/0002622 A1 | 1/2002 | Vange et al. | |
| 2002/0010795 A1 | 1/2002 | Brown | |
| 2002/0016174 A1 | 2/2002 | Gibson et al. | |
| 2002/0026439 A1 | 2/2002 | Monroe | |
| 2002/0042821 A1 | 4/2002 | Muret et al. | |
| 2002/0065903 A1 | 5/2002 | Fellman | |
| 2002/0133554 A1 * | 9/2002 | Checkoway et al. .......... | 709/206 |
| 2003/0009592 A1 | 1/2003 | Stahura | |
| 2004/0205473 A1 * | 10/2004 | Fisher et al. .................. | 715/500 |
| 2006/0190308 A1 * | 8/2006 | Janssens et al. ................. | 705/5 |
| 2008/0306968 A1 * | 12/2008 | Nandhra ........................ | 707/10 |

FOREIGN PATENT DOCUMENTS

| | | |
|---|---|---|
| WO | WO 00/14938 A2 | 3/2000 |
| WO | WO 01/95209 A2 | 12/2003 |

OTHER PUBLICATIONS

Web archieve, "www.idnames.com," May 2000; 5 pages.

Web archieve, "www.netnames.co.uk/," May 2000, 45 pages.

Web archieve, "www.register.com," May 2000 and before, 25 pages.

Web archieve, "www.netnames.com,"May 2000, 3 pages.

Web archieve, www.alldomains.com, May 2000, 7 pages.

Amarasiri, "Web based domain registration and payment system for LK domain registry," University of Moratuwa, Sri Lanka, pages cover (2), iix, 1-88.

Delmans, "Internet governance, 1st annual meeting of ICANN," europa.eu.it.int/information_society, pp. 1-11.

Fisher III, "Domain names and trademarks," case study, update May 2000, pp. 1-14.

Casarosa et al., "The evolution in the management of Top Level Domains:. ".it" as a case study," CNR-1AT, 8 pages.

Cabell, "Name conflicts," Berkman center for Inbternet & society, Harvard Law school, 26 pages.

Anderson et al,. "DNS Domain Name System," Mar. 1999, pages, cover, 1-24, a and b.

CENTR, "Best practice guidelines for ccTLD Managers," Feb. 2000, pp. 1-5.

* cited by examiner

AUTOMATED DOMAIN NAME REGISTRATION

This application is a divisional application of Ser. No. 09/585,316, filed on Jun. 2, 2000, now U.S. Pat. No. 7,000,028 which is incorporated herein by reference.

FIELD OF INVENTION

The present invention relates generally to the systems and methodologies of a domain name registration system and, more specifically, to an automated registration method incorporating real-time searches to determine the availability of a proposed domain name in multiple countries, and the ability to handle multinational registration requests, thereby allowing a user to register a domain name in multiple countries within a single web session.

BACKGROUND OF INVENTION

The Internet is an increasingly international network of computers that supports various forms and levels of communication. For instance, on the World Wide Web ("WWW"), information can be presented on universally available pages commonly known as "Websites." The Internet also supports one-on-one communication between end-users via electronic email and/or Internet bulletin board services. The common denominator in every form of communication over the Internet, however, is the use of Domain names to identify the computer to be contacted. The Domain name, which is referred to as an Internet protocol ("IP") number, is actually a unique combination of numbers separated by decimal points.

Because IP numbers can be cumbersome and difficult for Internet users to remember or practically use, the IP numbering system has been overlaid with the more user-friendly domain name system. This system allows Internet addresses to be assigned an alphanumeric designation or domain name, which directly correlates to the assigned IP number. Special computers known as domain name servers maintain tables linking domain names to their respective IP numbers.

Figure 6:
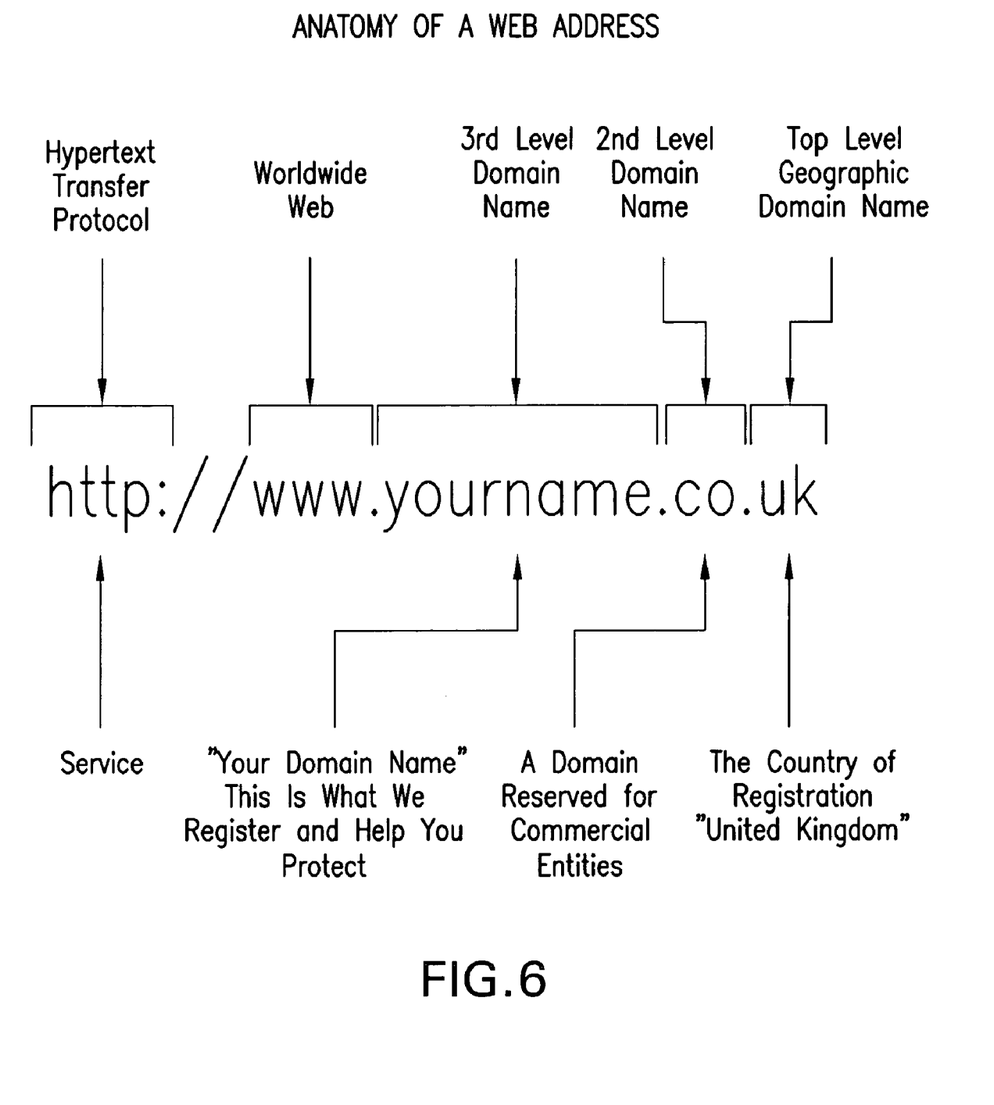
FIG. 6 is the anatomy of a domain name that defines the various subparts of a domain name

The anatomy domain name consists of more than two parts is FIG. 6, called domain levels, separated by a period (called a "dot"). The Top-Level-Domain level ("TLD"), which is referred to by its Internet zone designation, ".com," or ".gov.," ".uk,", etc., is found to the right of the dot. TLDs which represent a specific country are referred to as Country-Code TLDs, or ccTLDs. The Second-Level-Domain ("SLD") or Third Level Domain, which is commonly referred to as the "domain name," consists of characters (including letters, numbers, and hyphens) located immediately to the left of the dot.

For the domain name address system to operate properly, each "domain name" within a particular TLD must be unique, even if it differs from another "domain name" by only one character. In order to prevent duplicate "domain names" from being assigned, a single entity, commonly referred to as a "Registry," is ultimately responsible for maintaining a complete database of all of the "domain names" in each particular TLD In the majority of generic (e.g., .com, .net, .org) domain name ("gTLD") registrations, there is little or no human intervention in the registration process. A computerized database maintained by the registry electronically records the assigned relationship between the more easily remembered domain name and its corresponding IP number (received from an international entity tasked with assigning all IP numbers) and reports this information to the TLD registry for recordation in the master database of all "domain names". The registrar also enters into a registration agreement (contract) with each registrant, and records and maintains vital registrant contact and billing information.

Due to the vital role domain names play in Internet communication, the easy, immediate, secure, and dependable registration and maintenance of domain names is necessary to the continued rapid growth of the Internet. Traditionally, these tasks have been undertaken by a single registrar in each TLD. The Internet, however, continues to grow at unprecedented rates. For example, in 1993, there were only about one million computers linked to the Internet. By 1999, the number of Internet users had exceeded 200 million as businesses and individuals adopted the Internet for various personal and commercial uses. This phenomenal increase in the number of users obviously led to an equally impressive increase in the number of "domain name" registrations. This increase, coupled with the probable advantages brought about by free competition and choice in the registration process, has fostered and promoted the idea of multiple registrars in a single TLD.

Many companies are also realizing the importance of registering their "domain names" and trademarks in every possible TLD, including not only the gTLDs, but also the 350 plus ccTLDs across the globe. However, with over 350 possible ccTLD, each with unique registration requirements and availabilities, the registration process can be quite cumbersome. As an example, most ccTLD registries have different data formats for the registration process; and certain ccTLD registries have limited payment formats such as only accepting payments in their own country's currency. Because each ccTLD registry can have different registration processes, a global registration of a single domain name can take months.

The existing system at www.idnames.com, allows a user to search and register their "domain name(s)" in multiple ccTLDs, however the searching is not done in real-time and much of the backend registration process must be done manually by people.

Figure 1:
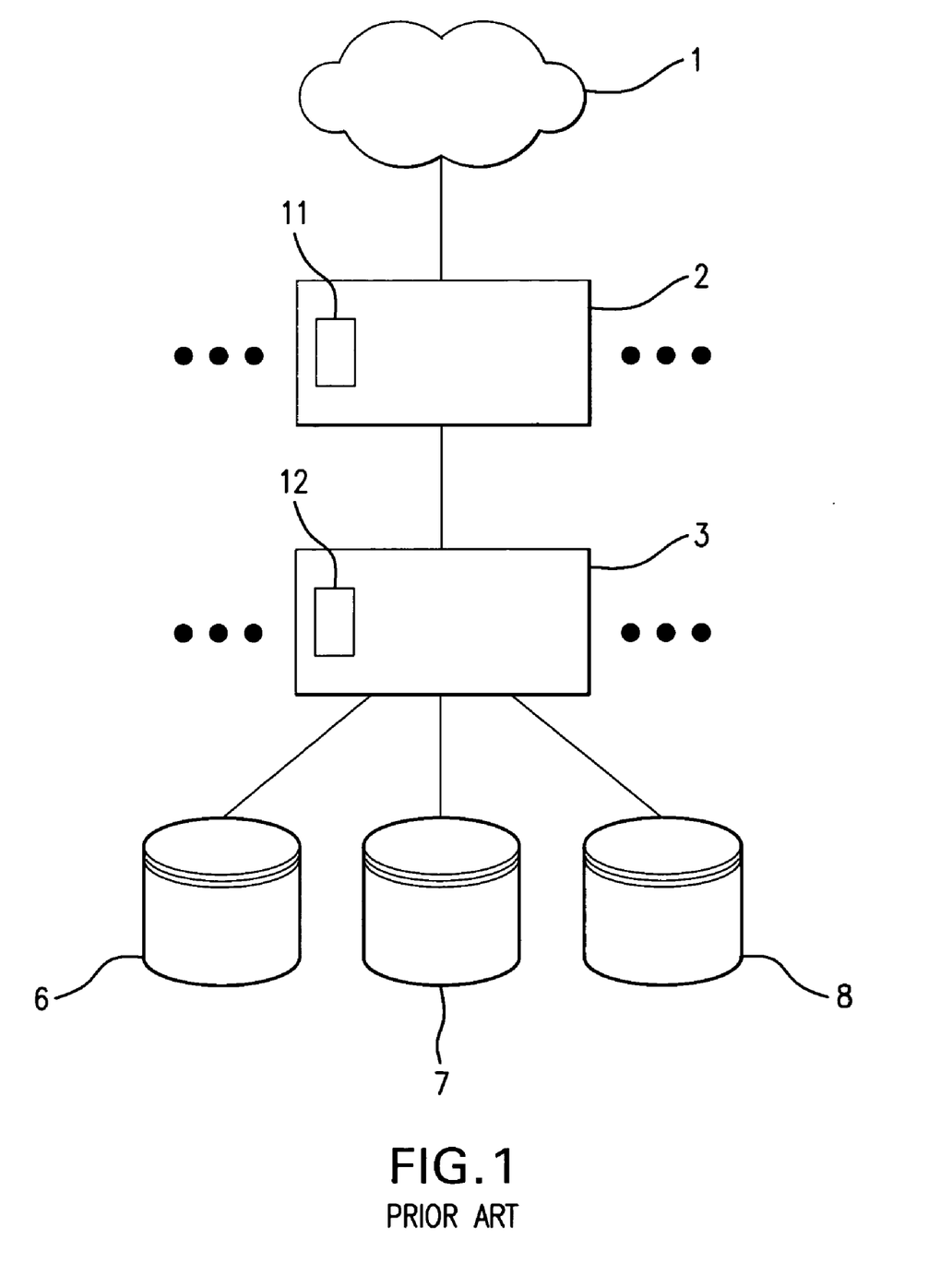
FIG. 1 is a network diagram of a typical prior art system for searching and registering ccTLDs.

As shown if FIG. 1, a typical conventional system is connected to the Internet 1 via the registrar's web server 2. The web server 2 can include multiple servers running in parallel. As users input search requests, the web server 2 compiles a search request file 11, and after a predetermined amount of time or requests are counted, web server 2 forwards the search request file 11 to the second tier, or application server 3. A typical amount of time between transfers has been approximately 30 minutes. Application server 3 combines the search request files 11 into cumulated search request file 12 and executes the search requests in seriatum against the Domain Name System ("DNS") 6. The system can also accept and process payment information through credit card data base 7, and maintain internal records of the searches and registrations in database 8. When a particular search has been completed, the user is notified, e.g., by email or mail, so that the user can then select from among the available ccTLDs and send the selections with payment back to the registrar. Registrar personnel then orchestrate the necessary forms and payments to register the user's proposed "domain name" with each of the chosen ccTLDs.

Examples of existing online registration facilities which allow registration of domain names with several different ccTLDs can be found on the Internet at places such as, www.alldomains.com, www.register.com, www.completedomains.com, and www.netnames.com.

Of these facilities, www.completedomains.com appears to offer online submissions of payment for seemingly automated registration, but utilizes dropdown menus which require the user to select in advance a single ccTLD to search.

In addition, the dropdown menu only lists the ccTLD, not the country. With over 188 ccTLDs, most users cannot easily determine which countries the ccTLD represents (i.e., is .au Austria or Australia). www.alldomains.com also requires the user to individually search every ccTLD of interest and requires the user to know the ccTLD-country correlation.

www.netnames.com only allows a user to search and register domain names online in the gTLDs (i.e., .com, .net, .org) or the ccTLD of the hosting company's country (in that case, the UK). The rest of the ccTLDs must be purchased offline. Similarly, www.register.com limits the user to searching for three ccTLDs at a time.

One reason why existing ccTLD searching is limited to single or small numbers of ccTLDs at any given time, is to protect the web site and associated backbone system from an overload situation. Because of the large number of ccTLDs, if numerous users attempted to search numerous ccTLDs, the existing search mechanisms would quickly bog down. Thus, providers of this type of service have either provided only offline, non-real-time searching, or limited the number of ccTLDs that can be searched at any given time to small numbers, to prevent users from inadvertently overloading their systems.

None of the existing web sites offer a complete online package that allows a user to automatically search and register available domain names in a large number of ccTLDs (e.g., 10 or more) from different countries.

SUMMARY OF THE INVENTION

It is therefore an object of the present invention to provide a highly automated online system and method for permitting users to find and register available domain names in more than 10 different ccTLDs.

It is also an object of the invention to provide real-time searching of over 100 different ccTLD for each user in a few minutes or less.

It is another object of the invention to provide a real-time searching mechanism for multiple ccTLDs that is scalable.

It is also an object of the invention to provide an online environment which allows the user to select the available ccTLDs from a list of available ccTLDs, and purchase the desired ccTLDs online.

It is another object of the invention to provide a system which formats a user's information in the appropriate manner for each selected ccTLD and automatically performs the necessary transactions to register each ccTLD.

As the international leader in the development of domain name registry and registrar procedures, protocol, and infrastructure, Network Solutions, Inc., through the named inventors, has developed a highly automated system and method to accomplish the above and other goals. The system permits users to find and register available domain names in over 100 different ccTLD options. This system provides real-time searching of large numbers (e.g., 10-hundreds) of ccTLDs for each user. The real-time nature of the searches allows completion of a search of approximately 100 registration options in less than a few minutes, and in a preferred embodiment, in less than 30 seconds. Thus, the entire search is completed in real-time, i.e., within a reasonable online website session. After the search, the user can simply select the available ccTLDs from the resultant list, and purchase the desired ccTLDs online. The system formats the user's information in the appropriate manner for each selected ccTLD and performs the necessary electronic transactions to register each ccTLD.

DETAILED DESCRIPTION OF THE INVENTION

Aspects of the present invention, as depicted in FIGS. 2-5, provide an automated method for searching, selecting, and registering domain names with different ccTLDs.

Figure 2:
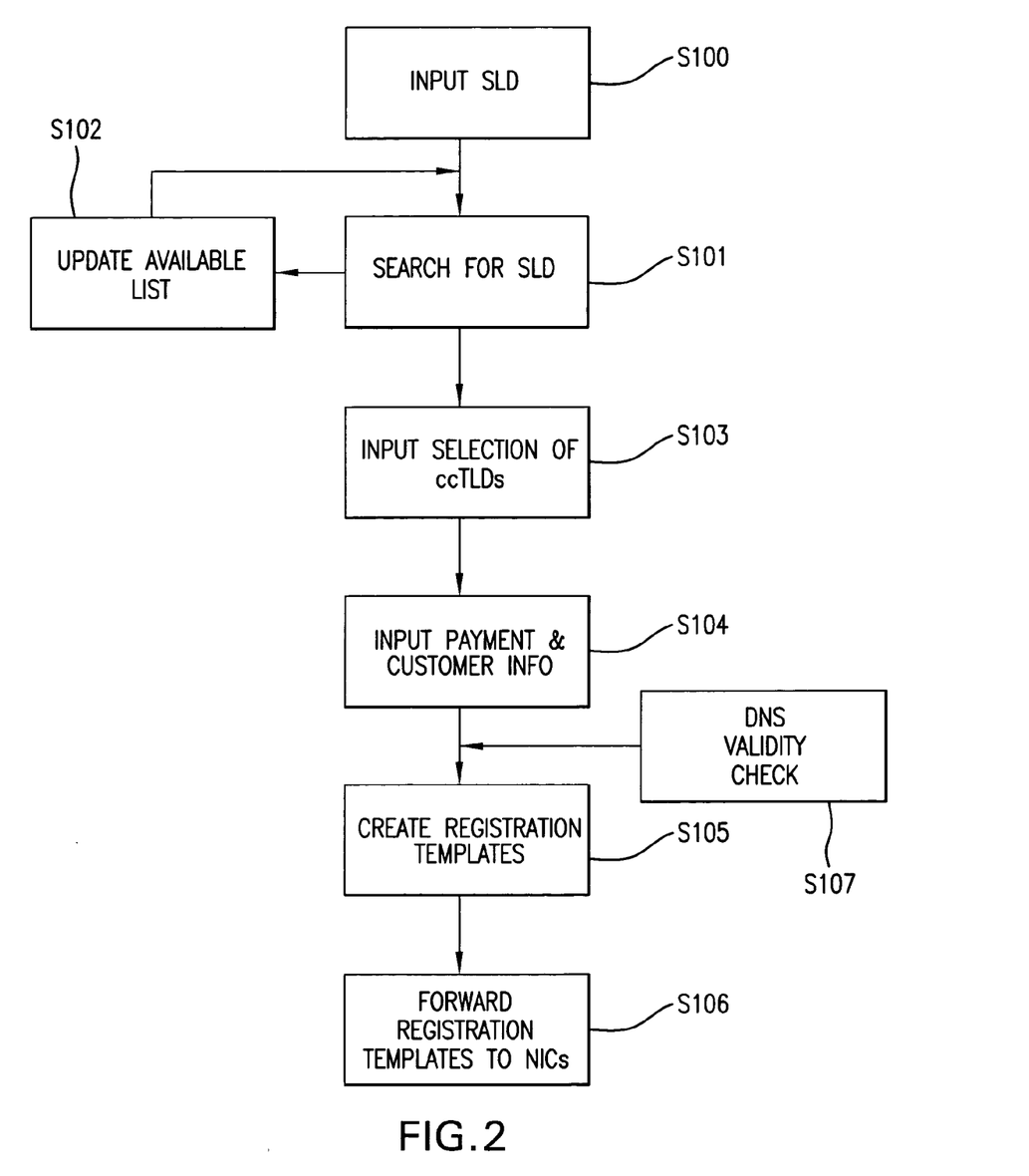
FIG. 2 is a flow chart depicting a method of searching and registering multiple ccTLDs according the one embodiment of the present invention.

FIG. 2 is a flowchart outlining the method of online registration according to an embodiment of the present invention. As shown therein, the system accepts an inputted proposed "domain name" from a user via a website (s100). The system then searches for the proposed "domain name" (s101) in numerous (e.g., >=10) ccTLDs from different countries to determine if the proposed "domain name" is available in each of the ccTLDs. During the search process (s101), the system creates and updates a list of available ccTLDs based on the search results as the results are obtained (s102). The website can refresh its reading of the list to display the available ccTLDs for the proposed SLD, during the search.

When the search has completed, the system allows the user to select/deselect the available ccTLDs for registration from the website (s103). The system then accepts the user's inputted personal data, an indication of the ccTLDs that the user has selected for registration of the second/third level "domain name", and payment information (s104). This information can be taken at any time during the process, but in this embodiment, the information is taken after the search so that the user can perform trial searches without feeling obligated or burdened. Using this information, the system generates registration templates for the registration of the selected ccTLDs. The registration templates are formatted based on the requirements of the appropriate ccTLD registries corresponding to the ccTLDs (s105). The templates are then forwarded to the appropriate registry for each selected ccTLD (s106).

Depending on the country, the processing at the registry could be manual or automated. However, that aspect is hidden from the user, as the present invention automates the process at least up to the point where the information is sent to the registry of the various countries. Notification of the user that a registration is complete can be done in any number of ways, including email from the system according to the present invention, or email directly from the individual ccTLD registry.

Figure 3:
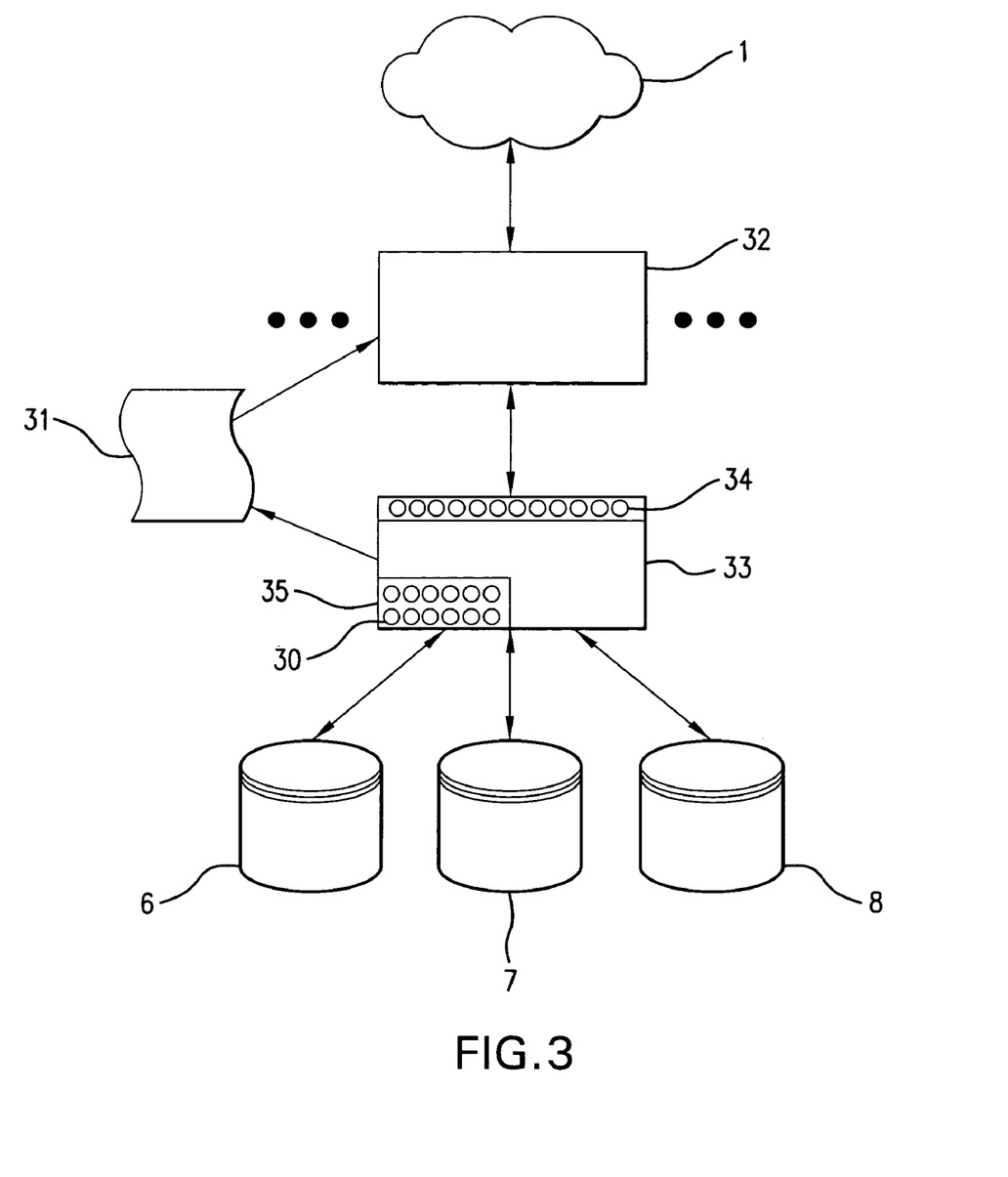
FIG. 3 is a network diagram of a system according to one embodiment of the present invention for searching and registering ccTLDs.

FIG. 3 depicts an overview of a system according to a preferred embodiment of the present invention. As shown therein, a user connects to the registrar's web server 32 via the internet 1. Application server 33 is programmed, for example by instructions on a computer-readable storage medium, to maintain a pool of request threads for managing the requests and transferring information regarding the requests between web server 32 and application server 33. Web server 32 inputs the user's search request information and obtains a request thread 34 from application server 33. If the user inputs more than one "domain name" to be searched, the system will allocate additional request threads 34 as needed. Web server 32 then returns the request thread 34 containing search information such as the "domain name" and the ccTLDs to be searched (default can be all ccTLDs), to application server 33.

Application server 33 is programmed, for example by instructions on a computer-readable storage medium, to break down the search request into batches of for example, 10-20 ccTLDs each. Each batch is assigned to a search thread 30, which in the preferred embodiment, may be performed during search step S101 and the search threads 30 defined as objects in an object-oriented data model (using e.g., Java, C++, etc . . . ) so that they operate 'independently' of each other. Each search thread 30 searches a small number of ccTLDs (e.g., 10-20) on the DNS 6, such as during step S101, so that a single thread; does not bog down the system. Each search thread 30 sends the results of its search to results list 31, which web server 32 frequently rereads to update the user on the search progress. When a search thread 30 is done it waits in search thread pool 35 for the next search request or the next group of ccTLDs in the same search request.

Search thread pool 35 provides a robust, real-time search mechanism, because it allows the reuse of objects in an object oriented data model. The search threads 30 are kept 'alive' in thread pool 35, but enter a 'sleep' or inactive mode. This reduces time because the search threads 30 do not need to be recreated for each search.

The number of search threads 30 in pool 35 can be controlled. The number can be a limited number of search threads 30 based on system capabilities to help avoid overloading the system. In addition, the number of search threads 30 is dynamic and can be optimized by a system administrator (manually or automatically) to better serve the search requests.

The search thread pool 35 thus provides a scalable search mechanism. Since DNS 6 can be multiprocessor-based, and the search threads 30 can operate independently of each other, the search threads 30 can be carried out at the same time in parallel on different processors to speed up the overall search. And as demands increase, the search mechanism can be scaled along with the DNS 6, e.g., as more CPUs are added to the DNS 6, more search threads 30 can be allocated to the search thread pool 35.

Figure 4:
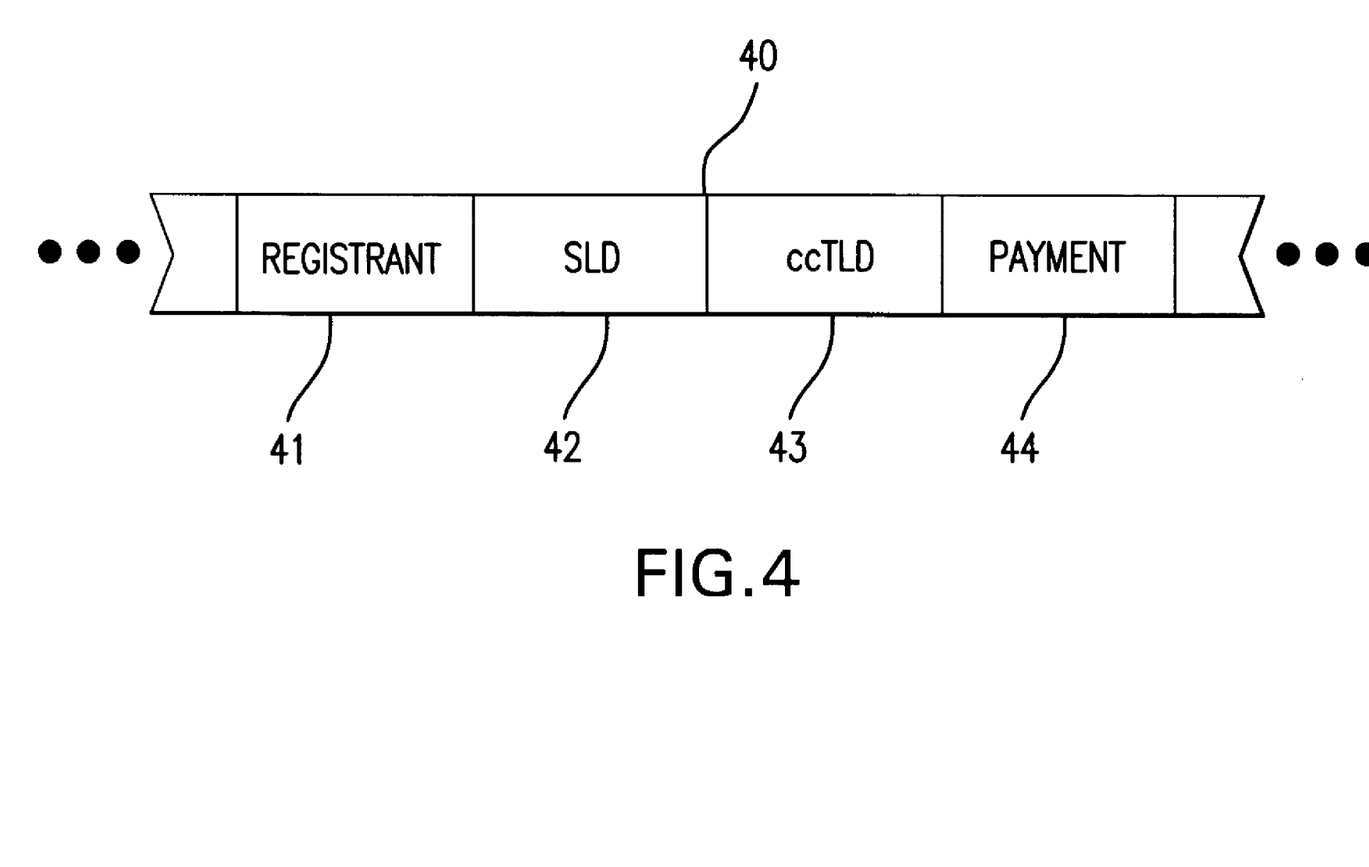
FIG. 4 is a conceptual illustration of a sample registration template for use with a particular ccTLD.

FIG. 4 is conceptual illustration of a sample registration template 40 for use with a particular ccTLD. As shown therein, the template 40 includes user or registrant information 41 such as name, address, etc., the proposed "domain name" 42 and ccTLD 43, and payment information 44 according to the particular ccTLD.

Figure 5:
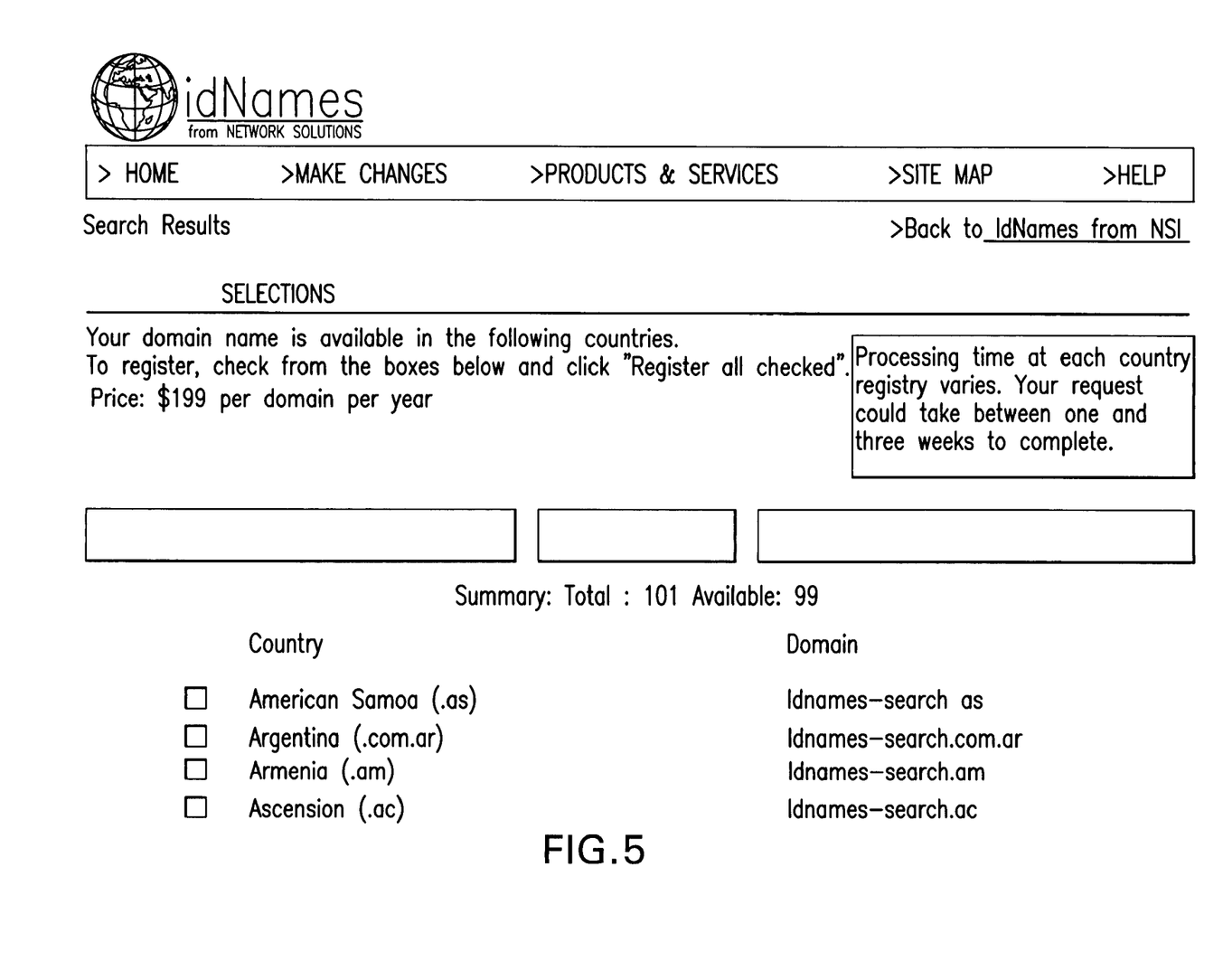
FIG. 5 is a conceptual illustration of a sample screen seen by a user according to one embodiment of the invention.

FIG. 5 is an example of a screen 50 seen by a user during a search, according to one embodiment of the invention. As shown therein, the embodiment provides the user with the status 51 of the number of ccTLDs searched during the search. The system can also provide the user with a growing list 52 of search results. The search results in this embodiment are displayed with an indication of the country 53 corresponding to each ccTLD, along with an indication of the availability 54 of the ccTLD.

Another important aspect of the invention is the ability to automate the process of setting up the appropriate DNS Zone Files to support the submission of a domain name template to the appropriate ccTLD registry, (S107) in FIG. 2. To successfully process a submitted domain name template, many ccTLD registry's require that DNS Zone Files (DNS Zone Files contain the Primary and Secondary DNS server name and IP address) be set-up PRIOR to the acceptance of a domain name registration template.

There are two options provided to an end-user of the invention to set-up DNS Zone Files. Option A is the an Easy Set-Up option that will allow the user to elect that Network Solutions automatically set-up and host the necessary DNS Zone Files to support the domain name registration templates sent to all selected ccTLD registry's; the Primary and Secondary DNS information required is provided by NSI and displayed for the end-user in data entry fields that are shaded to indicate that the end-user is not required to input information in those fields. Option B is an Expert Set-Up option that allows the user to select the option and then enter the Primary and Secondary Name Server and IP Address they elect to use to support their requested domain name registrations.

If an end-user elects to choose Option B (Expert Set-Up) and enter the appropriate information, the invention will perform a DNS validity check to ensure that the DNS Zone Files are set-up in a manner that will resolve the requested domain name in the requested ccTLD properly to the Primary and Secondary DNS Server IP addresses. If the DNS information provided by the end-user is not set-up properly to allow Primary and Secondary IP address resolution a message will be returned to the user to identify the error. Additional information will be provided to the end-user to assist him/her in properly setting-up the necessary DNS Zone Files PRIOR to continuing in the automated ccTLD registration process.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention. For example, parts of the present invention are preferably implemented using an object-oriented language such as the JAVA or C++ language, but is certainly not limited to either of these languages. Rather, the present invention includes any language that can practice the invention as outlined in the appended claims. In addition, the number, arrangement, and connectivity of the relevant computers including servers, databases, and network equipment, can be modified in many configurations and still practice the invention as claimed. Also, while the above registration process had been described as occurring within a single website session, the present invention contemplates providing a 'park and return' option so that the user can take a break from the session and return later without having to redo the entire session. Finally, while the above description refers to foreign registration entities as registries, it is within the scope of the invention to forward information to intermediaries which subsequently forward information to the appropriate registries, or to some other entity which performs the final registration of the domain name.

We claim:

1. A method for determining if a domain name is available for registration, comprising:

receiving a search request to determine the availability of a sublevel domain in a plurality of ccTLDs from a user, wherein the sublevel domain combined with a ccTLD represents a complete domain name;

prior to conducting a search based on the search request, dividing said search request into a plurality of subsearches;

assigning each subsearch to a search thread in a persistent search thread pool; and conducting each subsearch in parallel, each subsearch querying a server responsible for determining the availability of a domain name for at least one ccTLD contained in the subsearch.

2. A method according to claim 1, wherein said search threads are defined as objects in an object oriented data model.

3. A method according to claim 2, wherein said pool of search threads has a fixed number of search threads.

4. A method according to claim 2, wherein said pool of search threads has an adjustable number of search threads.

5. A method according to claim 1, where the search threads contain a status flag, including but not limited to indicating, whether the search thread is active or inactive.

6. A method according to claim 1, where the user is required to enter user personal data only once per registration session.

7. A method according to claim 1, where the user is required to enter user personal data only once for a plurality of registration sessions.

8. A non-transitory computer-readable storage medium storing instructions adapted to be executed by a computer processor to cause an electronic system to perform steps including:
 receiving a search request to determine the availability of a sublevel domain in a plurality of ccTLDs from a user, wherein the sublevel domain combined with a ccTLD represents a complete domain name;
 prior to conducting a search based on the search request, dividing said search request into a plurality of subsearches;
 assigning each subsearch to a search thread in a persistent search thread pool;
 conducting each subsearch in parallel, each subsearch querying a server responsible for determining the availability of a domain name for at least one ccTLD contained in the subsearch.

9. A computer-readable storage medium according to claim 8, wherein said search threads are defined as objects in an object oriented data model.

10. A computer-readable storage medium according to claim 8, wherein said pool of search threads has a fixed number of search threads.

11. A computer-readable storage medium according to claim 8, wherein said pool of search threads has an adjustable number of search threads.

12. A computer-readable storage medium according to claim 8, wherein said search threads individually return the results of the subsearches during said search so that the user is kept apprised of the progress of said search.

13. A computer-readable storage medium according to claim 8, where the search threads contain a status flag, including but not limited to indicating, whether the search thread is active or inactive.

14. A computer-readable storage medium according to claim 8, where the instructions require the user to enter user personal data only once per registration session.

15. A computer-readable storage medium according to claim 8, where the instructions require the user to enter user personal data only once for a plurality of registration sessions.

16. An apparatus for determining if a domain name is available for registration, comprising:
 a processor; and
 a memory coupled to said processor, said memory storing instructions adapted to be executed by said processor to perform steps including:
  receiving a search request to determine the availability of a sublevel domain in a plurality of ccTLDs from a user, wherein the sublevel domain combined with a ccTLD represents a complete domain name;
  prior to conducting a search based on the search request, dividing said search request into a plurality of subsearches;
  assigning each subsearch to a search thread in a persistent search thread pool; and
  conducting each subsearch in parallel, each subsearch querying a server responsible for determining the availability of a domain name for at least one ccTLD contained in the subsearch.

17. An apparatus according to claim 16, wherein said search threads are defined as objects in an object oriented data model.

18. An apparatus according to claim 16, wherein said pool of search threads has a fixed number of search threads.

19. An apparatus according to claim 16, wherein said pool of search threads has an adjustable number of search threads.

20. An apparatus according to claim 16, wherein said search threads individually return the results of the subsearches during said search so that the user is kept apprised of the progress of said search.

21. An apparatus according to claim 16, where the search threads contain a status flag, including but not limited to indicating, whether the search thread is active or inactive.

22. An apparatus according to claim 16, where the instructions require the user to enter user personal data only once per registration session.

23. An apparatus according to claim 16, where the instructions require the user to enter user personal data only once for a plurality of registration sessions.

24. A system for determining if a domain name is available for registration, comprising:
 means for receiving a search request over an electronic communication network to determine the availability of a sublevel domain in a plurality of ccTLDs from a user, wherein the sublevel domain combined with a ccTLD represents a complete domain name;
 means for dividing said search request into a plurality of subsearches prior to conducting a search based on the search request;
 means for assigning each subsearch to a search thread in a persistent search thread pool; and
 a microprocessor configured to conduct each subsearch in parallel within a computer-readable database, each subsearch querying a server responsible for determining the availability of a domain name for at least one ccTLD contained in the subsearch.

25. A system according to claim 24, wherein said search threads are defined as objects in an object oriented data model.

26. A system according to claim 24, wherein said pool of search threads has a fixed number of search threads.

27. A system according to claim 24, wherein said pool of search threads has an adjustable number of search threads.

28. A system according to claim 24, wherein said search threads individually return the results of the subsearches during said search so that the user is kept apprised of the progress of said search.

29. A system according to claim 24, where the search threads contain a status flag, including but not limited to indicating, whether the search thread is active or inactive.

30. A system according to claim 24, with means for requiring the user to enter user personal data only once per registration session.

31. A system according to claim 24, with means for requiring the user to enter user personal data only once for a plurality of registration sessions.

32. A method according to claim 1, comprising:

completing the search, including each subsearch, in no more than 30 seconds from when the request was received.

33. A computer-readable storage medium according to claim 8, wherein the steps include:

completing the search, including each subsearch, in no more than 30 seconds from when the request was received.

34. An apparatus according to claim 16, wherein the steps include:

completing the search, including each subsearch, in no more than 30 seconds from when the request was received.

35. A system according to claim 24, comprising:

means for completing the search, including each subsearch, in no more than 30 seconds from when the request was received.

36. A method according to claim 1, wherein each subsearch queries a DNS server.

37. A computer-readable storage medium according to claim 8, wherein each subsearch queries a DNS server.

38. An apparatus according to claim 16, wherein each subsearch queries a DNS server.

39. A system according to claim 24, wherein each subsearch queries a DNS server.

* * * * *